United States Patent  (10) Patent No.: US 11,787,993 B1
Al-Nakhli et al.  (45) Date of Patent: Oct. 17, 2023

(54) IN-SITU FOAMED GEL FOR LOST CIRCULATION

(71) Applicant: Saudi Arabian Oil Company, Dhahran (SA)

(72) Inventors: Ayman Raja Al-Nakhli, Dammam (SA); Wajdi Mohammed Buhaezah, Dammam (SA); Saleh A. Haidary, Dammam (SA); Rami A. Sindi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/705,956

(22) Filed: Mar. 28, 2022

(51) Int. Cl.
 *E21B 21/00* (2006.01)
 *C09K 8/512* (2006.01)
 *E21B 33/138* (2006.01)
 *C09K 8/504* (2006.01)

(52) U.S. Cl.
 CPC ............ *C09K 8/512* (2013.01); *C09K 8/5045* (2013.01); *E21B 21/003* (2013.01); *E21B 33/138* (2013.01)

(58) Field of Classification Search
 None
 See application file for complete search history.

(56) References Cited

U.S. PATENT DOCUMENTS

| | | | |
|---|---|---|---|
| 4,003,818 A | 1/1977 | Juillard et al. | |
| 4,564,997 A | 1/1986 | Matsuo | |
| 4,846,277 A | 7/1989 | Khalil | |
| 5,495,891 A | 3/1996 | Sydansk | |
| 5,513,712 A | 5/1996 | Sydansk | |
| 5,706,895 A | 1/1998 | Sydansk | |
| 6,680,206 B1 | 1/2004 | McDevitt et al. | |
| 7,199,083 B2 | 4/2007 | Zevallos | |
| 7,642,223 B2 * | 1/2010 | Santra .................. | E21B 33/138 |
| | | | 507/221 |
| 9,293,750 B2 | 3/2016 | Yang et al. | |
| 10,365,564 B2 | 7/2019 | Cha et al. | |
| 10,761,428 B2 | 9/2020 | Cha et al. | |
| 10,926,227 B2 | 2/2021 | Cha et al. | |
| 10,983,439 B2 | 4/2021 | Cha et al. | |

(Continued)

FOREIGN PATENT DOCUMENTS

| | | |
|---|---|---|
| CN | 1556771 | 12/2004 |
| CN | 1681596 | 10/2005 |

(Continued)

OTHER PUBLICATIONS

CN Office Action in Chinese Appln. No. 201880060968, dated Feb. 28, 2023, 21 pages, with English Translation.

(Continued)

*Primary Examiner* — Andrew Sue-Ako
(74) *Attorney, Agent, or Firm* — Fish & Richardson P.C.

(57) ABSTRACT

A system and method for treating lost circulation, including providing a treatment fluid including a polymer and a nitrogen-generating compound through a wellbore into a lost circulation zone in a subterranean formation, generating nitrogen gas in the lost circulation zone by a reaction of the nitrogen-generating compound, generating foam from the nitrogen gas and the treatment fluid in the lost circulation zone to give foamed polymer in the lost circulation zone, and plugging the lost circulation zone with the foamed polymer.

22 Claims, 5 Drawing Sheets

(56) References Cited

U.S. PATENT DOCUMENTS

| | | | |
|---|---|---|---|
| 2004/0146803 | A1 | 7/2004 | Kohl et al. |
| 2008/0246052 | A1 | 10/2008 | Hsu |
| 2009/0104564 | A1 | 4/2009 | Yang |
| 2010/0330721 | A1 | 12/2010 | Barlocchi et al. |
| 2011/0114318 | A1* | 5/2011 | Ezell ................ C09K 8/512 166/305.1 |
| 2011/0123771 | A1 | 5/2011 | Stavis et al. |
| 2011/0296903 | A1 | 12/2011 | Han et al. |
| 2012/0120226 | A1 | 5/2012 | De Jonge |
| 2012/0267603 | A1 | 10/2012 | Lee et al. |
| 2013/0125630 | A1 | 5/2013 | Collins et al. |
| 2013/0236698 | A1 | 9/2013 | Stavis et al. |
| 2013/0316329 | A1 | 11/2013 | Yu |
| 2014/0363623 | A1 | 12/2014 | Sun et al. |
| 2016/0363600 | A1 | 12/2016 | Sniadecki et al. |
| 2017/0067836 | A1 | 3/2017 | Hull |
| 2017/0114242 | A1 | 4/2017 | Lloyd et al. |
| 2019/0700566 | | 3/2019 | Kidambi et al. |
| 2019/0225861 | A1* | 7/2019 | Reddy .............. C04B 12/025 |
| 2020/0301282 | A1 | 9/2020 | Cha et al. |
| 2021/0024813 | A1* | 1/2021 | Al-Taq .............. C09K 8/845 |
| 2021/0162352 | A1 | 6/2021 | Cha et al. |

FOREIGN PATENT DOCUMENTS

| | | |
|---|---|---|
| CN | 101084469 | 12/2007 |
| CN | 101323780 | 12/2008 |
| CN | 101493006 | 7/2009 |
| CN | 101831163 | 9/2010 |
| CN | 108025909 | 5/2018 |
| CN | 111108440 | 5/2020 |
| JP | 2004193525 | 7/2004 |
| JP | 2006514413 | 4/2006 |
| JP | 2006520697 | 9/2006 |
| JP | 2009134255 | 6/2009 |
| JP | 2009539261 | 11/2009 |
| JP | 2010518615 | 5/2010 |
| JP | 2013527103 | 6/2013 |
| JP | 2015128818 | 7/2015 |
| JP | 6947482 | 10/2021 |
| KR | 20160014504 | 2/2016 |
| WO | WO 2009149362 | 12/2009 |
| WO | WO 2013078306 | 5/2013 |
| WO | WO 2015161205 | 10/2015 |
| WO | WO 2017009710 | 1/2017 |
| WO | WO 2019032903 | 2/2019 |

OTHER PUBLICATIONS

EPO Communication Pursuant to Article 94(3) in European Appln. No. 19824162.2, dated Jan. 26, 2023, 4 pages.
CA Office Action in Canadian Appln. No. 3,075,166, dated Apr. 26, 2021, 5 pages.
GCC Examination Report in GCC Appln. No. GC 2018-35814, dated Jan. 30, 2020, 3 pages.
GCC Examination Report in GCC Appln. No. GC 2019-38180, dated Aug. 18, 2020, 5 pages.
GCC Examination Report in GCC Appln. No. GC 2019-38756, dated Sep. 29, 2020, 3 pages.
GCC Examination Report in GCC Appln. No. GC 2019-38180, dated Dec. 13, 2020, 4 pages.
GCC Examination Report in GCC Appln. No. GC 2019-38180, dated Mar. 23, 2021, 4 pages.
CN Office Action in Chinese Appln. No. 201980087226, dated Dec. 30, 2021, 12 pages, with English Translation.
JP Office Action in Japanese Appln. No. 2020-507597, dated Apr. 20, 2021, 5 pages, with English Translation.
JP Office Action in Japanese Appln. No. 2021-591756, dated Nov. 2, 2021, 7 pages, with English Translation.
PCT International Search Report and Written Opinion in International Application No. PCT/US2018/046118, dated Nov. 9, 2018, 15 pages.
PCT International Search Report and Written Opinion in International Application No. PCT/US2019/048322, dated Jan. 7, 2020, 13 pages.
PCT International Search Report and Written Opinion in International Application No. PCT/US2019/063996, dated Mar. 23, 2020, 14 pages.
Al-Nakhli et al., "A breakthrough water shutoff system for super-K zones in carbonate Ghawwar Field: Absorption and polymer system," SPE 179790, presented at the SPE EOR Conference at Oil and Gas West, Muscat, Oman, Mar. 2016, 22 pages.
Bageri et al., "Complex barite filter cake removal using in-situ generated acids by thermochemicals," Scientific Reports, Sep. 2020, 10:15773, 8 pages.
Becker et al., "Polymer microfluidic devices," Talanta, Feb. 11, 2002, 56(2), 21 pages.
Hutton et al., "Fusible-particle system helps to control severe lost circulation while drilling across a fractured zone in Elk Hills Field, CA," presented at the SPE Western Regional Meeting, San Jose, California, Mar. 2009, 12 pages.
Kim et al., "Liquid-cell Transmission Electron Microscopy for Tracking Self-assembly of Nanoparticles," Journal of Visualized Experiments, 2017, 128, 10 pages.
Kim et al., "Potential of nanobubbles generated by ultrasonication in aqueous alkyl polyglycoside solutions," Journal of Colloid and Interface Science, 2000, 223:285-291, 7 pages.
Lee et al., "Site-Selective In Situ Grown Calcium Carbonate Micromodels with Tunable Geometry, Porosity and Wettability," Advanced Functional Materials, 26, Jul. 1, 2016, 10 pages.
Lifton, "Microfluidics: an enabling screening technology for enhanced oil recovery (EOR)," Lab on a Chip, Royal Society of Chemistry, May 21, 2016, 16(10), 20 pages.
Lu et al., "Fabrication of Nanostructure by Template Method in Microfluidics," Chinese Journal of Analytical Chemistry, 37(6), Jun. 1, 2009, 6 pages.
Mo et al, "Formation and stability of ultrasonic generated bulk nanobubbles," Chinese Phys. B, 2018, 27, 118104, 8 pages.
Ohgaki et al., "Physicochemical approach to nanobubble solutions," Chemical Engineering Science, 2010, 65:1296-1300, 5 pages.
Pu et al., "Liquid cell transmission electron microscopy and its applications," Royal Society Open Science, 2020, 24 pages.
Ren et al., "Materials for Microfluidic Chip Fabrication," Accounts of Chemical Research, 46(11), Jun. 11, 2013, 11 pages.
Robertson et al., "Nanoparticle Immobilization for Controllable Experiments in Liquid-Cell Transmission Electron Microscopy," ACS Applied Materials & Interfaces, 2018, 10:22801-22808, 8 pages.
Sander et al., "Template-Assisted Fabrication of Dense, Aligned Arrays of Titania Nanotubes with Well-Controlled Dimensions of Substrates," Advanced Materials, Nov. 2004, 16(22), 6 pages.
Savari et al., "Managing lost circulation in highly fractured, vulgular formations: Engineered usage of high fluid loss squeeze and reticulated foam lost circulation materials," presented at the IADC/SPE International Drilling Conference and Expedition, Galveston, Texas, Mar. 2020, 11 pages.
Song et al., "Chip-off-the-rock: the study of reservoir-relevant geological processes with real-rock micromodels," Royal Society of Chemistiy, 2014, 14:4382-4390, 9 pages.
Spende et al., "TiO2, SiO2, and Al2O3 coated nanopores and nanotubes produced by ALD in etched ion-track membranes for transport measurements," Nanotechnology, Aug. 2015, 26, 12 pages.
Tariq et al., "Reduction of Breakdown Pressure by Filter Cake Removal Using Thermochemical Fluids and Solvents: Experimental and Numerical Studies," Molecules, Jul. 2021, 26(15):4407, 21 pages.
Zheng et al., "Surface Effect on Oil Transportation in Nanochannel: a Molecular Dynamics Study," Nanoscale Research letters, Jun. 2017, 12(1), 9 pages.
Zhu et al., "Applications of a novel lost circulation additive," presented at the International Petroleum Technology Conference, Mar.-Apr. 2021, 16 pages.

* cited by examiner

IN-SITU FOAMED GEL FOR LOST CIRCULATION

TECHNICAL FIELD

This disclosure relates to treating lost circulation.

BACKGROUND

In oil or gas well construction, such as drilling and cementing, lost circulation occurs when drilling fluid (mud) or cement slurry flows into the subterranean formation instead of flowing up the annulus between the formation and the casing or work string. Lost circulation is the partial or complete loss of drilling fluid or cement slurry to the formation during drilling or cementing operations. Lost circulation can be brought on by natural or induced causes. Natural causes include naturally fractured formations or unconsolidated zones. Induced losses occur when the hydrostatic fluid column pressure exceeds the fracture gradient of the formation and the formation pores break down adequately to receive rather than resist the fluid. For non-cavernous formations, a lost circulation zone may be the result of fractures in the geological formation at the borehole or wellbore. When lost circulation occurs, both drilling fluid and cement slurry can be lost.

Drilling fluid aides the drilling of holes into a subterranean formation in the Earth crust. The holes may be labeled as a borehole or a wellbore. The drilling fluid may be called drilling mud. The hole may be drilled for the exploration or production of crude oil and natural gas. The hole may be drilled for other applications, such as a water well. During the drilling, the drilling fluid may cool and lubricate the drill bit and also carry and remove rock cuttings from the hole. The drilling fluid may provide hydrostatic pressure to prevent or reduce formation fluids from the subterranean formation entering into the hole during drilling. Drilling fluids can include completion fluids, workover fluids, drill-in fluids, and so on.

Oil and/or gas well cementing may include mixing a slurry of cement and water, and pumping the slurry down the wellbore casing, tubing, or drill pipe to a specified elevation or volume in the well. Primary cementing may involve casing cementation. In particular, primary cementing may be the cementing that takes place soon after the lowering of the casing into the hydrocarbon formation and may involve filling the annulus between the casing and the hydrocarbon formation with cement. Secondary cementing may include various cementing operations in which cement is pumped into a well during drilling or production phases. Secondary cementing can involve remedial cementing such as squeeze cementing.

SUMMARY

An aspect relates to a method of treating lost circulation, including providing a treatment fluid having a polymer and at least one nitrogen-generating compound through a wellbore into a lost circulation zone in a subterranean formation; generating nitrogen gas in the lost circulation zone by a reaction of the at least one nitrogen-generating compound, wherein the reaction is activated by a temperature of the subterranean formation or by an acid, or both; generating foam from the nitrogen gas and the treatment fluid in the lost circulation zone to give foamed polymer in the lost circulation zone; and plugging the lost circulation zone with the foamed polymer.

Another aspect relates to a method of treating lost circulation, including providing a treatment fluid having a polymer, a crosslinker, and a nitrogen-generating compound through a wellbore into a lost circulation zone in a subterranean formation; generating nitrogen gas in-situ in the lost circulation zone by a reaction of the nitrogen-generating compound, wherein the reaction is activated by a temperature of the subterranean formation or by an acid, or both; generating foam in-situ from the nitrogen gas and the treatment fluid in the lost circulation zone to give foamed treatment fluid in the lost circulation zone, wherein the foamed treatment fluid includes foamed polymer; and sealing the lost circulation zone with the foamed treatment fluid, wherein the polymer of the foamed polymer undergoes crosslinking via the crosslinker to give a foamed polymer gel.

Yet another aspect is a method of treating lost circulation, including injecting a treatment fluid having a polymer, a crosslinker, and a nitrite-containing compound through a wellbore into a lost circulation zone in a subterranean formation; reacting the nitrite-containing compound in the lost circulation zone to give nitrogen gas in the lost circulation zone; generating foam in the lost circulation zone via the nitrogen gas giving the polymer as foamed polymer in the lost circulation zone; and sealing the lost circulation zone with the foamed polymer, wherein sealing the lost circulation zone includes the foamed polymer as a foamed polymer gel restricting fluid flow from the wellbore into the subterranean formation at the lost circulation zone.

Yet another aspect relates to a method of treating lost circulation, including pumping a treatment fluid having a polymer, a crosslinker, and a nitrogen-generating compound through a wellbore into a lost circulation zone in a subterranean formation. The method includes forming nitrogen gas via activation of a reaction of the nitrogen-generating compound in the lost circulation zone, thereby foaming the treatment fluid in the lost circulation zone to give foamed treatment fluid having the polymer as foamed polymer, wherein the activation is by heat or by acid, or both, wherein the heat is from the subterranean formation, and wherein nitrogen gas is not added to the treatment fluid at Earth surface. The method includes crosslinking the foamed polymer via the crosslinker to give foamed crosslinked polymer comprising a foamed polymer gel, wherein the foamed polymer gel restricts fluid flow from the lost circulation zone into the wellbore.

The details of one or more implementations are set forth in the accompanying drawings and the description below. Other features and advantages will be apparent from the description and drawings, and from the claims.

DETAILED DESCRIPTION

Figure 1:
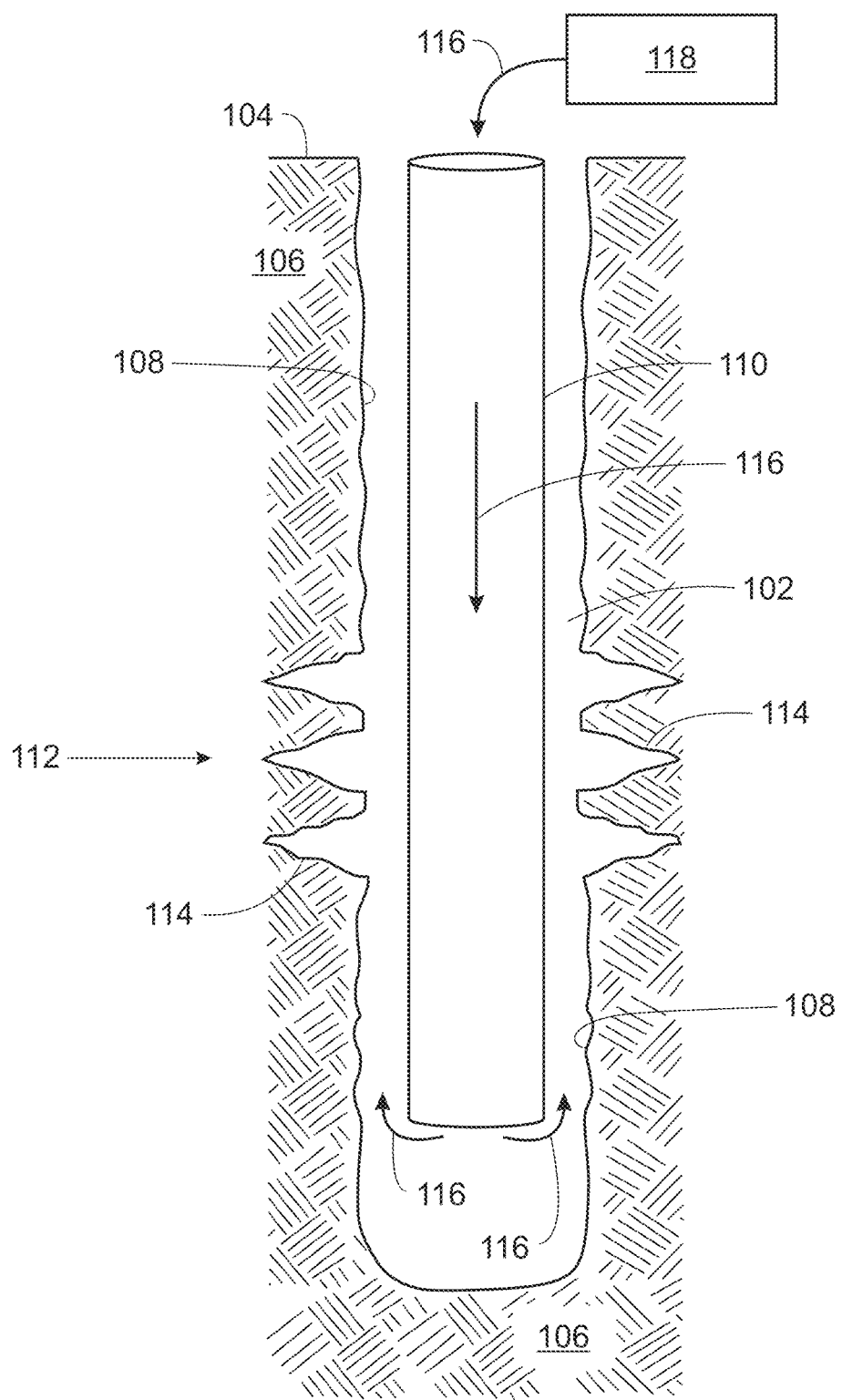
FIG. 1 is a diagram of a well site having a wellbore through the Earth surface into a subterranean formation in the Earth crust.

Aspects of the present disclosure are directed to controlling lost circulation by plugging the thief zone with in-situ foamed gel. In implementations, gas is not added to the treatment composition (treatment fluid) at surface. The treatment fluid has a thermochemical reagent(s) (e.g., $NH_4Cl$ and/or $NaNO_2$) that may be labeled as a nitrogen-generating compound(s). The treatment may typically include a foaming agent. The treatment fluid can be drilling fluid (also called drilling mud) or lost circulation fluid more generally. The higher temperature of the subterranean formation may trigger a thermochemical reaction in the treatment fluid that generates nitrogen gas in-situ to promote foaming of the gel (polymer) to give the in-situ foamed gel that damages (plugs, seals) the formation to reduce or eliminate formation permeability at the lost circulation zone. The foamed polymer may harden or solidify into a solid gel. The solid gel as bonded to the formation rock plugs the thief zone. The treatment composition can include an adsorption system (e.g., amino-silane system) to promote bonding of the solid foamed gel to the formation rock (e.g., carbonate).

Thus, aspects of the present disclosure relate to a lost-circulation treatment fluid (composition) that employs (includes) thermochemical reagents. The thermochemical reagents may be incorporated into the treatment fluid at surface, and the treatment fluid pumped into the well. The treatment fluid may be an aqueous solution including polymer or polymer gel. The treatment fluid may generally be a liquid at surface and as introduced into the well. The reaction of the thermochemical reagents in the treatment fluid may be activated downhole by reservoir temperature or by a chemical activator. The reaction of the thermochemical reagents generates nitrogen gas that may foam the treatment fluid in-situ. Consequently, the treatment fluid as foamed (having foamed polymer or foamed polymer gel) may beneficially expand to cover larger areas and volumes of the lost circulation zone than if the treatment fluid were not foamed. Thus, the present foaming of the treatment fluid via in-situ generation of nitrogen gas can be more cost effective than if the treatment fluid were not foamed. The in-situ foaming of the aqueous treatment fluid having polymer may beneficially result in utilizing less volume of fluid for the lost circulation treatment than if the treatment fluid were not foamed. The in-situ generated foam may plug (seal) the lost circulation zone.

A challenge faced when drilling oil and gas wells can be severe to total lost circulation in naturally fractured formations. Loss of circulation is the uncontrolled flow of whole mud into the subterranean formation from the wellbore during drilling, cementing, testing, and other construction operations. Lost circulation can result in lost drilling rig time, stuck pipe (associated with drilling), increased cost due to lost drilling fluid, well control situations, bad zonal isolation due to poor cement placement, and so forth.

Embodiments herein control lost circulation by generating in-situ foamed gel. Once drilling fluid (as a treatment fluid having the polymer and thermochemical reagents) starts to leak into the subterranean formation from the wellbore at the lost circulation zone, the temperature of the fluid may increase because formation temperature may be higher than the wellbore temperature. Exposing the drilling fluid to higher temperature may trigger thermochemicals in the drilling fluid (or treatment fluid more generally) to generate in-situ foamed gel and plug the thief zone. The treatment fluid can be utilized as a drilling fluid and/or a lost circulation fluid.

Again, the techniques may control lost circulation via generating in-situ foamed gel. Foaming agents and foam stabilizers may be included in the treatment fluid system. Nitrogen-generating compounds, such as sodium nitrite and ammonium chloride, may be incorporated with the lost circulation fluid and/or drilling fluid system and pumped into the wellbore that suffers of lost circulation. Upon injecting the treatment fluid into a thief zone, these nitrogen-generating compounds may be activated by downhole temperature or by an added activator. When these reactants (nitrogen-generating compounds) are activated, nitrogen gas may be generated in-situ and foamed polymer thereby created to seal the thief zone. The foaming of the polymer (gel) may promote covering of a relatively large area in sealing fractures and channels. Calcium bicarbonate and acids can also be added to the lost circulation fluid system to generate carbon dioxide ($CO_2$) in situ. When sodium bicarbonate reacts with acids, $CO_2$ gas may be generated, which may create more stability for the foam. Silica gel or guar may also be included to the fluid system to increase the viscosity of foamed polymer. Surfactants may also be added to improve (increase) foam stability. An adsorption system (such as amino-saline system) may be included in the treatment fluid to promote bonding of the polymer downhole to formation rock, which may enhance the stability of the foam and advance sealing of the lost circulation zone. In implementations, surface gas pumps are not required to prepare the foam and instead only typical fluid (liquid) pumps are utilized to deliver the treatment fluid into the wellbore. Conversely, when foam is generated at the Earth surface, as in traditional foamed fluid preparation, hydrostatic pressure may be low and thus pumping issues with liquid pumps may be encountered.

The treatment fluid may generate foamed polymer in the thief zone (lost circulation zone) due to increase in temperature of the treatment fluid cause by the treatment fluid entering the thief zone. The thief zone may have a higher temperature than the treatment fluid (e.g., drilling fluid). Moreover, the fluid system (treatment fluid) can be activated to generate nitrogen gas (and thus foam) while be pumped downhole through the wellbore or in the lost circulation zone in the subterranean formation by adding a chemical activator to the treatment fluid directly at Earth surface. The treatment fluid can be activated to generate nitrogen gas (and thus foam) in the lost circulation zone in the subterranean formation by adding an activator separate from the treatment fluid, such pumped through the annulus between the formation and drill string to the lost circulation zone. The activator can be an acid.

The treatment fluid may be a water-based treatment fluid. In some implementations, the treatment fluid is an aqueous solution of polymer (to be crosslinked) in which water is the primary component of the treatment fluid. The treatment fluid may be, for example, at least 90 volume percent (vol %) of water or at least 90 weight percent (wt %) of water. The treatment fluid includes a crosslinker for crosslinking the polymer, and at least one nitrogen-generating compound. The treatment fluid can be gel-based fluids.

The treatment fluid includes the polymer to be crosslinked and that can be labeled as a polymer gel or gel. This polymer can be, for example, polyacrylamide (PAM). The polymer may be polyacrylamide homopolymer or a polyacrylamide copolymer, or both. The polyacrylamide copolymer may be PAM-co-AA, which is a copolymer of polyacrylamide and acrylic acid (or a copolymer of acrylamide monomer units and acrylic acid monomer units). The polymer may be a copolymer of acrylamide monomer units and acrylate monomer units. Other polymers are applicable. The average molecular weight of the polymer (e.g., PAM homopolymer or PAM copolymer) can be in the range of 10,000 to 50,000,000. The polymer concentration in the treatment fluid can be, for example, in the range of 1 pound per barrel (lb/bbl) to 12 Ib/bbl. The treatment fluid may include the polymer (e.g., polyacrylamide as a homopolymer, or polyacrylamide as a copolymer having acrylamide monomer units and other monomer units) at a concentration, for example, in the range of 2 vol % (or wt %) to 6 vol % (or wt %). The polymer may be in the range of 2-6 w/v % (weight/volume percentage concentration) of the polymer (e.g., PAM-co-AA) in the water in the treatment fluid or in the treatment fluid. For examples of applicable polymer, crosslinkers, and the adsorption system, see U.S. Pat. No. 11,111,753, which is incorporated by reference herein in its entirety.

For crosslinking this polymer, the treatment fluid may include a crosslinker at a concentration in the range, for example, of 0.5 gallons per thousand gallons (gpt) to 4 gpt. The crosslinker may be an organic crosslinker (e.g., polyethyleneimine) or an inorganic crosslinker.

For the treatment fluid as drilling fluid, the polymer (e.g., acrylamide polymers) to be crosslinked may also serve to enhance (increase) the viscosity of the drilling fluid to lubricate the drill bit and carry rock cuttings to the surface. Additional polymers included in the treatment fluid to so enhance the viscosity of the treatment fluid may be, for example, water-soluble polymers, such as xanthan gum, guar gum, polysaccharides, polyanonic cellulose, polyvinyl alcohol, polyethylene oxide, and so on. Aluminum hydroxide silicates and mixed-metal hydroxide silicates may be included in the treatment fluid to enhance (increase) viscosity if desired.

The concentration of the nitrogen-generating compound(s), e.g., thermochemical reagent(s), in the treatment fluid can be, for example, in the range of 1 molar to 30 molar. The unit of molar is molar concentration in moles of the component per liters of the treatment fluid.

The nitrogen-generating compound(s) (e.g., thermochemical reagents) in the treatment fluid may include a nitrite-containing compound that provides nitrite ions and/or an ammonium-containing compound that provides ammonium ions. The nitrite-containing compound as a thermochemical reagent that provides nitrite ions can include, for example, sodium nitrite, potassium nitrite, and the like. The concentration of the nitrite-containing compound (e.g., sodium nitrite) in the treatment fluid can be, for example, less than 15 molar, or in the range of 0.5 molar to 10 molar (or 1 molar to 9 molar).

The ammonium-containing compound as a thermochemical reagent that provides ammonium ions can include, for example, ammonium hydroxide, ammonium chloride, ammonium bromide, ammonium nitrate, ammonium nitrite, ammonium sulfate, ammonium carbonate, ammonium hydroxide, and the like. The concentration of the ammonium-containing compound (if included) in the treatment fluid can be, for example, less than 12 molar, or in the range of 0.5 molar to 8 molar (or 1 molar to 6 molar).

In implementations, the nitrite-containing compound can be more generally be compounds that can provide or generate nitrite ions. A compound (analogous to the nitrite-containing compound) that can participate in the thermochemical reaction (in lieu of or in addition to the nitrite-containing compound) to generate the nitrogen gas is sodium hypochlorite.

In implementations, the ammonium-containing compound can more generally be compounds that can provide or generate ammonium ions. A compound (analogous to the ammonium-containing compound) that can participate in the thermochemical reaction (in lieu of or in addition to the ammonium-containing compound) to generate the nitrogen gas is urea. Urea, also known as carbamide, is an organic compound with the chemical formula $CO(NH_2)_2$.

Pairs of the nitrogen-generating compounds may be included in the treatment fluid as thermochemical reagents to participate in the in-situ thermochemical reaction (e.g., activated by formation temperature and/or presence of an activator acid) to generate nitrogen. The pairings of a first thermochemical reagent-second thermochemical reagent (ammonium-nitrite combinations) in the treatment fluid formulations can include urea-sodium hypochlorite, urea-sodium nitrite, ammonium hydroxide-sodium hypochlorite, ammonium chloride-sodium nitrite, and the like. The below-depicted example equation for the thermochemical reaction has the first thermochemical reagent-second thermochemical reagent pair as ammonium chloride ($NH_4Cl$)-sodium nitrite ($NaNO_2$).

($H+$ or $\Delta H$)

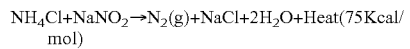

$$NH_4Cl + NaNO_2 \rightarrow N_2(g) + NaCl + 2H_2O + Heat(75 Kcal/mol)$$

In the thermochemical reaction (an exothermic reaction) depicted immediately above, sodium chloride (NaCl), water ($H_2O$), and heat are generated in addition to the generated $N_2$. The heat generated may be, for example, 75 kilocalories per mol (Kcal/mol). The thermochemical reaction can be activated by heat ($\Delta H$) and/or a hydrogen ion ($H+$) such as from an acid. While the thermochemical reaction may experience an enthalpy change, the symbol $\Delta H$ here represents the addition of heat, e.g., at temperatures greater than 120° F., such as in the range of 120° F. to 375° F. The chemical activator may be a compound (e.g., acid) capable of releasing an acidic hydrogen.

The thermochemical reaction of the thermochemical reagents in the treatment fluid may be initially activated (triggered, promoted, advanced) by temperature (heat), such as activated or triggered at a temperature in the range of 120° F. to 150° F., e.g., at 140° F. The thermochemical reaction of the thermochemical reagents in the treatment fluid may be initially activated, for example, at a temperature in the range of 120° F. to 180° F. or in the range of 120° F. to 160° F. In implementations, the thermochemical reaction can be further advanced or promoted at temperatures greater than 160° F. or 180° F. In embodiments, the thermochemical reaction of the thermochemical reagents is not activated by heat or temperature at temperatures less than 120° F. or less than 140° F., depending on the embodiment. However, in those embodiments, the temperature of regions of the subterranean formation (including the lost circulation zone) adjacent to the wellbore (e.g., the near wellbore region) being at values greater than 120° F., 130° F., 140° F., etc. may activate or trigger the thermochemical reaction of the thermochemical reagents. Further, as discussed, a chemical activator (e.g., acid) can activate the thermochemical reagents and their thermochemical reaction at temperatures less than 120° F., 130° F., or 140° F., as well as activate or advance (promote) the thermochemical reaction at temperatures greater than 120° F., 130° F., or 140° F.

Heat provided by the subterranean formation (in the lost circulation zone) may activate the thermochemical reaction of the nitrite-containing compound with the ammonium-containing compound. In implementations, the ammonium-containing compound (e.g., ammonium chloride) and nitrite-containing compound (e.g., sodium nitrite) may react at formation temperature without an acid activator. The pH of the treatment fluid may influence the reaction triggering (activation) temperature. In some examples at pH above 11, the formation temperature (heat) is generally inadequate to activate the reaction. Therefore, an acid activator may be injected. In implementations, acids that can be used as an activator (chemical activator) for the reaction (e.g., a thermochemical reaction) of the nitrite-containing compound with the ammonium-containing compound (e.g., as thermochemical reagents) to generate nitrogen gas include weak acids (e.g., acetic acid, citric acid, etc.) and strong acids (hydrochloric acid, etc.). The strong acids when added to (or otherwise incorporated) into the treatment fluid can be concentrated or diluted. In embodiments, the acid is not included in the treatment fluid, but instead is pumped through the wellbore to the lost circulation zone in the subterranean formation after pumping the treatment fluid.

In general, a compound capable of releasing an acidic hydrogen can be utilized as the chemical activator in implementations. Moreover, reservoir temperature (temperature of the subterranean formation) may be adequate to activate the thermochemical reaction without a chemical activator. Such temperature activation based on formation temperature (heat) alone may readily occur in certain implementations, for example, at pH less than 11.

Further, in implementations, the ammonium-containing compound (e.g., ammonium chloride) and the nitrite-containing compound (e.g., sodium nitrite) may generally not react in the treatment fluid at Earth surface. Also, in embodiments, little or no extent of this reaction may occur while the treatment fluid is traveling downhole through the wellbore to the lost circulation zone. In instances, the temperature of the treatment fluid (e.g., drilling fluid, lost circulation fluid, etc.) while at surface and flowing through the wellbore may be below the triggering temperature of the reaction. Therefore, encapsulation of the nitrogen-generating compounds (to delay reaction) may generally not be needed or implemented.

The reaction (e.g., thermochemical reaction) activation of the reaction of the nitrogen generating compound(s) may be a function of temperature and pH. In certain implementations, this reaction can be activation by formation temperature at pH less than 11 and is generally not activated by formation at pH greater than 11.

The pH of the treatment fluid can be increased, for example, by including and adjusting the amount hydroxide-containing compounds (e.g., sodium hydroxide) in the treatment fluid, to adjust reaction activation temperature in view of the wellbore and reservoir (subterranean formation) temperature. In certain embodiments, the pH of the treatment fluid may be increased to at least 11 (e.g., in the range of 11 to 13, or 11 to 12.5), so the reaction will generally not take place without a chemical activator. An activator can be injected as a post-flush to reduce the pH and trigger the reaction. When implemented, a post-flush with acidic fluid may include organic acid (e.g. acetic acid, etc.) or inorganic acid (e.g., hydrochloric acid, citric acid, etc.).

A nitrite-containing compound(s) can be employed as a stand-alone reactant without ammonium ions or acid to generate $N_2$ gas. See the Example below. Nitrite-containing compounds can be employed as a stand-alone thermochemical reagent (reactant) in the treatment fluid without ammonium ions (and without acid, for example, at pH of the treatment fluid less than 11) to generate $N_2$ gas. As discussed, in general, nitrogen-generating compounds may be included in the treatment fluid to generate nitrogen gas when activated. Again, these nitrogen-generating compounds (e.g., thermochemical reagents) may be activated by heat or acids. One component of the reactants can be sufficient to generate nitrogen. In the Example below, sodium nitrite was utilized to generate nitrogen without an ammonium-containing compound (e.g., ammonium chloride). However, when both reactants are utilized in the thermochemical reaction equation given above.

Surfactant(s) may be included in the treatment fluid as a foaming compound(s) that is a foaming agent (foamer) and/or a foam stabilizer. The surfactant(s) may provide additional functions, such as to increase viscosity of the treatment fluid. Surfactant molecules may have a hydrophilic molecular head and a hydrophobic molecular tail. Surfactants may be compounds that reduce the surface tension or interfacial tension between two liquids, between a gas and a liquid, or between a liquid and a solid. The surfactant(s) included in the treatment fluid may be an anionic surfactant, a cationic surfactant, or a nonionic surfactant, or any mixtures thereof. With respect to the surfactants, the term "nonionic" may mean not ionic, not anionic, and not cationic. A nonionic surfactant may have covalently bonded oxygen-containing hydrophilic groups, which are bonded to hydrophobic parent structures. The water-solubility of the oxygen groups may be the result of hydrogen bonding.

The treatment fluid may include the surfactants for at least the function(s) of a foaming compound (foaming agent and/or foam stabilizer). The surfactant concentration (e.g., foaming compound concentration, foaming agent concentration, foam stabilizer concentration, or combined foaming agent/foam stabilizer concentration) may be in the range of 1 lb/bll to 10 lb/bll (or in the range of 1 gpt to 60 gpt) to promote formation of the foam or to promote stability of the foam, or a combination thereof. One of ordinary skill in the art understands what is a foam stabilizer. One of ordinary skill in the art understands what is a foaming agent. Foaming agents and foam stabilizers are well known to one of ordinary skill in the art. The foaming compound as a foaming agent is a material (e.g., surfactant) that facilitates the formation (promotes the generation) of foam. When present (e.g., in relatively small amounts) the foaming agent may reduce surface tension of a liquid (reduces the work needed to create the foam). The foaming compound as a foam stabilizer may be characterized as compounds that facilitate or promote stability (resist collapsing) of the foam after generation of the foam. A foam stabilizer may increase the foam colloidal stability by inhibiting coalescence of bubbles. The foaming compound (foaming agent and/or foam stabilizer) may include, for example, the surfactants ethoxylated alcohols, ethoxylated sulfates, or sulfonates, or mixtures thereof. The foaming compound (foaming agent or foam stabilizer) may be a surfactant, such as a betaine (e.g., hydroxysulfobetaine) or a hydroxysultaine (e.g., cocamidopropyl hydroxysultaine). In general, foaming agents can be, for example, surfactants and fatty acid, and foam stabilizer can be organic or inorganic compounds, and nanomaterials.

Nanomaterial, such as silicon dioxide, e.g., silica nanoparticles having a diameter less than 100 nanometers (nm), can be included in the treatment fluid to improve (increase) foam stability. The term "nanoparticles" may refer to particles that have a mean cross-section, for example, a mean diameter, of less than 1000 nanometers (nm), less than 300 nm, less than 100 nm, or less than 10 nm. In some embodiments, the mean cross-section is measured by dynamic light scattering. The term "nanoparticles" may be inclusive of "nanosheets." The term "nanosheet" refers to a two-dimensional nanostructure. The thickness of a nanosheet is in a range of 1 nm to 100 nm.

Gas-generating compounds or components (e.g., bicarbonate to generate carbon dioxide) in addition to the thermochemical reagents may be included in the treatment fluid. The additional generated gas, e.g., carbon dioxide ($CO_2$), may promote formation and stability of the in-situ generated foam. In some implementations, the gas-generating component (in addition to the nitrogen-generating compound) is bicarbonate, such as calcium carbonate or sodium carbonate, or both. An acid may be included in the treatment fluid to react with the bicarbonate to generate the $CO_2$. To give the carbon dioxide gas, the bicarbonate may decompose in response to heat or react with acid (e.g., a weak acid such as acetic acid) included in the treatment fluid.

In implementations, the treatment fluid may include a viscosity enhancer to increase (control) viscosity of the treatment fluid. The viscosity enhancer may be, for example, surfactant, silica gel, polymer (e.g., polyvinyl alcohol, polyethylene oxide, etc.), and/or guar (guar gum), and the like. The viscosity enhancer may be included in the treatment fluid that is a drilling fluid to regulate (increase) the viscosity of the drilling fluid to promote flow stability, cooling of the drill bit, carrying of the rock cuttings to surface, supporting the wellbore formation wall, and the like. The concentration of the viscosity enhancer in the treatment fluid may be, for example, in the range of 0.5 gpt to 7 gpt, or in the range of 1 gpt to 5 gpt. The PAM or PAM copolymer discussed above may act as a viscosity enhancer. Guar (or guar gum) may be a hydrophilic polysaccharide from the seed of the guar plant. Guar (e.g., hydroxypropyl guar or caboxymethyl guar) may be characterized as a natural polymer.

The treatment fluid may include scavengers. A scavenger may be a treating chemical that is added to a drilling fluid or other fluid to react with a contaminant to change the contaminant to a less harmful compound. If a contaminant is harmful at very low concentration, a scavenger should be able to remove the contaminant to an even lower concentration. The scavenger can be, for example, an organic chemical, a zinc-based compound, or an iron-based compound. The scavenger may be an oxygen scavenger that reacts with oxygen in the treatment fluid to remove (convert) the oxygen. The scavenger may be a sulfide scavenger that reacts with sulfide (e.g., hydrogen sulfide) in the treatment fluid to remove (convert) the sulfide.

The treatment fluid may include an adsorption system (e.g., including amino-saline) to further promote bonding of the foamed polymer downhole to the formation rock at the circulation zone. The treatment fluid may include the adsorption system that further advances bonding of the foamed polymer to subterranean formation rock in the lost circulation zone. Some examples are the adsorption system including silane compounds or a combination of silane compounds and silicates. The term "adsorption system" as used herein refers to a composition utilized to promote (advance) the adhering (bonding) of the hardened (solid) foamed polymer to formation rock in the lost circulation zone. The adsorption system (such as an amino-saline system) may be employed to bond the polymer downhole to formation rock, which may enhance the stability of the solid foam and promote sealing (plugging) of the lost circulation zone in the subterranean formation. In certain implementations, the combining of the adsorption system with the treatment fluid may be delayed until the time (e.g., within 1 hour) of pumping the treatment fluid into the wellbore.

Thus, the treatment fluid can include an adsorption system (e.g., having silane, or silane and silicate) for bonding the polymer to formation rock. The adsorption system may increase the adhesion of the crosslinked polymer to a rock surface of the pores of the subterranean formation in the lost circulation zone. The adsorption system may include a silane compound or a silane compound and a silicate component. Therefore, embodiments of the adsorption system include a silane (e.g., 3-aminopropyltriethoxysilane). The adsorption system may have silicate, such as sodium silicate or potassium silicate, or both. The composition of the adsorption system may be modified based on the type of rock in the subterranean formation. For example, subterranean formations comprising a greater concentration of silicates, such as sandstone formations, may allow the treatment fluid to have an adsorption system having silane compounds but no silicates. In other formations, such as carbonate formations for example, the subterranean formation may have a lesser concentration of silicates, in which case the adsorption system of the treatment fluid may include both the silane compounds and the silicate components.

The silane compound may be an amino-silane compound, which may have at least one amine functional group. For example, in some embodiments, the silane compound may have the chemical formula $H_2N-R^1-Si(R^2)_3$, where $R^1$ is a linear or branched hydrocarbyl having from 1 to 20 carbon atoms, at least one $R^2$ is an alkoxy group having general formula $X-O-R^3$, wherein $R^3$ can be a linear or branched hydrocarbyl having 1 to 10 carbon atoms, and each of the other $R^2$ groups can be independently selected from a linear or branched hydrocarbyl having 1 to 10 carbon atoms, an amine group, or the aforementioned alkoxy group.

The treatment fluid (as injected into the wellbore and having the polymer [e.g., PAM] and crosslinker to give the polymer gel or solid polymer) may have a pH of in the range of 9 to 14, and prior to injection into the lost circulation zone, may have a viscosity in a range of 5 centipoise (cP) to 10 cP prior to injection. The treatment fluid having the polymer and crosslinker may also include additives, such as salts, fillers, organic compounds, preservatives, and rheology modifiers. Salts may be added to the treatment fluid to reduce or prevent clay swelling in the subterranean formation. Examples of salts include carboxylates. The salts included in the treatment fluid can include sodium, calcium, cesium, zinc, aluminum, magnesium, potassium, strontium, silicon, lithium, ammonium, chlorides, bromides, carbonates, iodides, chlorates, bromates, formats, nitrates, sulfates, phosphates, oxides, fluorides, or any combination of these. In implementations, the treatment fluid can include filler particles, such as silica particles (that can be larger than the silica nanoparticles that may be added for foam stability).

The transition of the polymer from a flowable liquid to a crosslinked gel may include formation of covalent bonds between individual polymers via crosslinking reactions, which may build viscosity in the treatment fluid. The concentration of crosslinker in the treatment fluid can depend on the temperature of the subterranean formation in the lost circulation zone. In implementations, the concentration of crosslinker in the treatment is in a range of 0.3 wt % to 2 wt %. An example of the treatment fluid 108 having the polymer and crosslinker in water at the surface 104 may include the polymer in a range of 3 wt % to 10 wt %, crosslinker (e.g., polyethyleneimine) in a range of 0.3 wt % to 2.0 wt %, and the silane (e.g., amino-silane) in a range of 3 wt % (or 5 wt %) to 10 wt %. This example of the treatment fluid may include silicate, such as sodium silicate or potassium silicate, or both. The polymer may have an average molecular weight of from 250,000 to 500,000 grams per mole. The treatment fluid may have an initial viscosity in a range of 5 cP to 10 cP at surface prior to injection into the wellbore (and into the lost circulation zone) and before crosslinking of the polymer.

FIG. 1 is a well site 100 having a wellbore 102 through the Earth surface 104 into a subterranean formation 106 in the Earth crust. The subterranean formation 106 may be labeled as a geological formation, a hydrocarbon formation, a rock formation having hydrocarbon, a formation reservoir, a hydrocarbon reservoir, a natural gas reservoir, a reservoir, etc. Upon completion of the wellbore 102, hydrocarbon may be produced from the subterranean formation 106 through the wellbore 102 to the surface 104. The hydrocarbon may be crude oil or natural gas, or both.

In constructing the wellbore 102, a treatment fluid 116 (as the treatment fluid discussed above) may be applied to cure lost circulation. The well site 100 may have a delivery system (which can be a recirculating drilling-fluid surface system) for providing the treatment fluid 116 through the wellbore 102 into the lost circulation zone 112. The treatment fluid 116 may generally be a liquid at surface 104 and as introduced into the wellbore 102. The delivery system includes a source of treatment fluid 116 at the Earth surface 104 near or adjacent the wellbore 102. The source may include one or more vessels holding the treatment fluid 116. The treatment fluid 116 may be stored in vessels or containers on ground, on a vehicle (for example, truck or trailer), or skid-mounted. For embodiments of the treatment fluid 116 as a drilling fluid (mud), the treatment fluid 116 may be handled, stored, processed as part of a recirculating drilling-fluid system.

To form the wellbore 102, a hole (borehole) is drilled into the subterranean formation 106 to generate a drilled formation surface 108 as an interface for the wellbore 102 with the subterranean formation 106. The formation surface 108 may be characterized as the wellbore 102 wall. Drilling of the wellbore 102 may continue to be performed below the casing 110. The wellbore 102 may have openhole portions but generally includes a cylindrical casing 110 as shown, which may be subjected to primary cementing. The wellbore 102 in the depicted implementation of FIG. 1 is to be a cased wellbore 102 or a wellbore having a cased portion.

In the illustrated embodiment, the wellbore 102 has a lost circulation zone 112 (also called a thief zone) caused by lost-circulation features 114 of the subterranean formation 106 at that portion of the wellbore 102. The lost-circulation features 114 along the wellbore 102 at the lost circulation zone 112 cause or contribute to the lost circulation. The lost-circulation features 114 are structural features or characteristics of the subterranean formation 106 at or near the wellbore 102. The features 114 may be fractures, voids, vugulars (vugs), gaps, permeable channels, cavities, cavernous openings, etc. A vugular may be a cavity in subterranean rock and can be lined with mineral precipitates. The lost circulation may be the loss (flow) of wellbore fluid (e.g., through the features 114) into the subterranean formation 106 at the lost circulation zone 112. In implementations, the lost circulation can be loss of wellbore fluid circulating through the wellbore, such as with the wellbore fluid flowing in the circulation upward through an annulus between the formation 106 and a casing or drill string in the wellbore 102. The wellbore fluid lost (that flows into the subterranean formation 106) may be drilling fluid, cement slurry, treatment fluid, workover fluid, etc.

In a drilling operation, drilling fluid (mud) introduced from the surface 104 (e.g., via mud pumps) flowing downward through the casing 110 (and drill string) discharges from the drill bit (not shown) at the bottom of the wellbore 102, and flows upward through the annulus between the subterranean formation 106 and the casing 110 toward the surface 104 as return drilling fluid. Some or all of the drilling fluid flowing upward through the annulus may be lost through the features 114 into the subterranean formation 106 at the lost circulation zone 112

For a cementing operation (e.g., primary cementing), the cement slurry may be introduced from the surface 104 into the casing 110 in the wellbore 102 and discharges from the bottom of the casing 110. The cement slurry then flows up through the annulus between the formation 106 and the casing 110 toward the surface 104. The cement slurry flowing upward in the annulus may be lost through the features 114 into the subterranean formation 106 at the lost circulation zone 112.

The present treatment fluid discussed above may be utilized to treat the lost circulation zone 112 to cure the lost circulation. The treatment fluid may be applied to the lost-circulation features 114 (e.g., to plug or seal the features 114) to reduce or prevent flow of drilling fluid or cement slurry through the features 114 into the subterranean formation 106. The treatment fluid 116 may be introduced (e.g., pumped) into the wellbore 102. The treatment fluid 116 may be pumped by a surface pump (e.g., mud pump) of the surface equipment 118 at the surface 104. In certain implementations, the pump may be associated with a drilling rig. The pump(s) can be skid-mounted in some instances. The pump may be a centrifugal pump, positive displacement (PD) pump, reciprocating PD pump such as a piston or plunger pump, and so on. The surface equipment 118 may include equipment (e.g., vessels, piping, pumps etc.) to prepare the treatment fluid 116. The surface equipment 118 may include equipment to support other operations at the well site 100.

The treatment fluid 116 may be a drilling fluid or more generally a lost circulation fluid (to treat lost circulation). In application, the treatment fluid 116 as pumped from the surface 104 into the wellbore 102 (injected into the casing 110) may flow down through the casing 110 and discharge from the bottom outlet of the casing 110, as depicted. The treatment fluid 116 as discharged from the casing 110 flows upward through the annulus between the formation 106 and the casing 110, and enters the lost circulation zone 112 in the formation 106. The temperature (heat) of the formation 106 may trigger (activate) a reaction of a nitrogen-generating compound (e.g., a thermochemical reagent) in the treatment fluid 116 to generate nitrogen gas in-situ in the lost circulation zone 112 in the formation 106.

This in-situ generation of nitrogen gas may foam the treatment fluid 116 giving in-situ formation of foam. Thus, polymer (e.g., PAM or PAM copolymer) in the treatment fluid 106 may be foamed giving foamed polymer that plugs the lost circulation zone 112 (e.g., fills and damages the features 114). The foamed polymer may be a polymer gel that is crosslinked via a crosslinker in the treatment fluid 116. The foamed polymer gel may solidify and bond to rock in the lost circulation zone 112 in the formation 106. In implementations, components (e.g., amino-silane components may promote adsorption (and thus bonding) of the foamed polymer gel to the formation 106 rock in zone 112 including at the features 114. Again, the crosslinker foamed polymer gel generally hardens into a solidified polymer gel that plugs the zone 112 to seal the zone 112 and thus cure the lost circulation.

The treatment fluid 116 may be the treatment fluid as discussed above. The treatment fluid may provide for an in-situ foamed polymer system developed as a lost circulation fluid and/or drilling fluid.

Thermochemical reagents (nitrogen-generating compounds) in the treatment fluid 116 may be activated by subterranean formation heat (temperature) to react to give gas (e.g., nitrogen) to generate foam. As discussed, an example of the thermochemical reagents is a combination of sodium nitrite and ammonium chloride, which when reacted generate nitrogen gas. The activator of the thermochemical reagents (and their thermochemical reaction) can be downhole temperature, as mentioned, and/or a chemical activator, such as acid (e.g., acetic acid, citric acid, hydrochloric acid, etc.). The treatment fluid 116 can include the chemical activator (for the thermochemical reagents), polymer (e.g., PAM or PAM copolymer) to be foamed for plugging the lost circulation zone 112, a crosslinker (e.g., polyethyleneimine) for crosslinking the polymer, surfactants, foaming compounds (foaming agents and/or foam stabilizers), additional gas-generating components (e.g., bicarbonate to generate carbon dioxide) to generate additional gas for further foam generation or stability, viscosity enhancers (e.g., guar), nanoparticles (for foam stabilization), an adsorption system (e.g., amino-silane system), and so forth. In application, the exothermic thermochemical reaction of the nitrogen-generating compound(s) may be activated due to downhole temperature (formation temperature in the lost circulation zone 112) and/or chemical activator. Thus, foam may be generated via the thermochemical reaction generating gas (e.g., nitrogen) in the treatment fluid in the lost circulation zone 112. As mentioned, in some implementations, nanoparticles (e.g., silica nanoparticles) may be included in the treatment fluid to further to stabilize the in-situ generated foam and thus act as a foam stabilizer.

Figure 2:
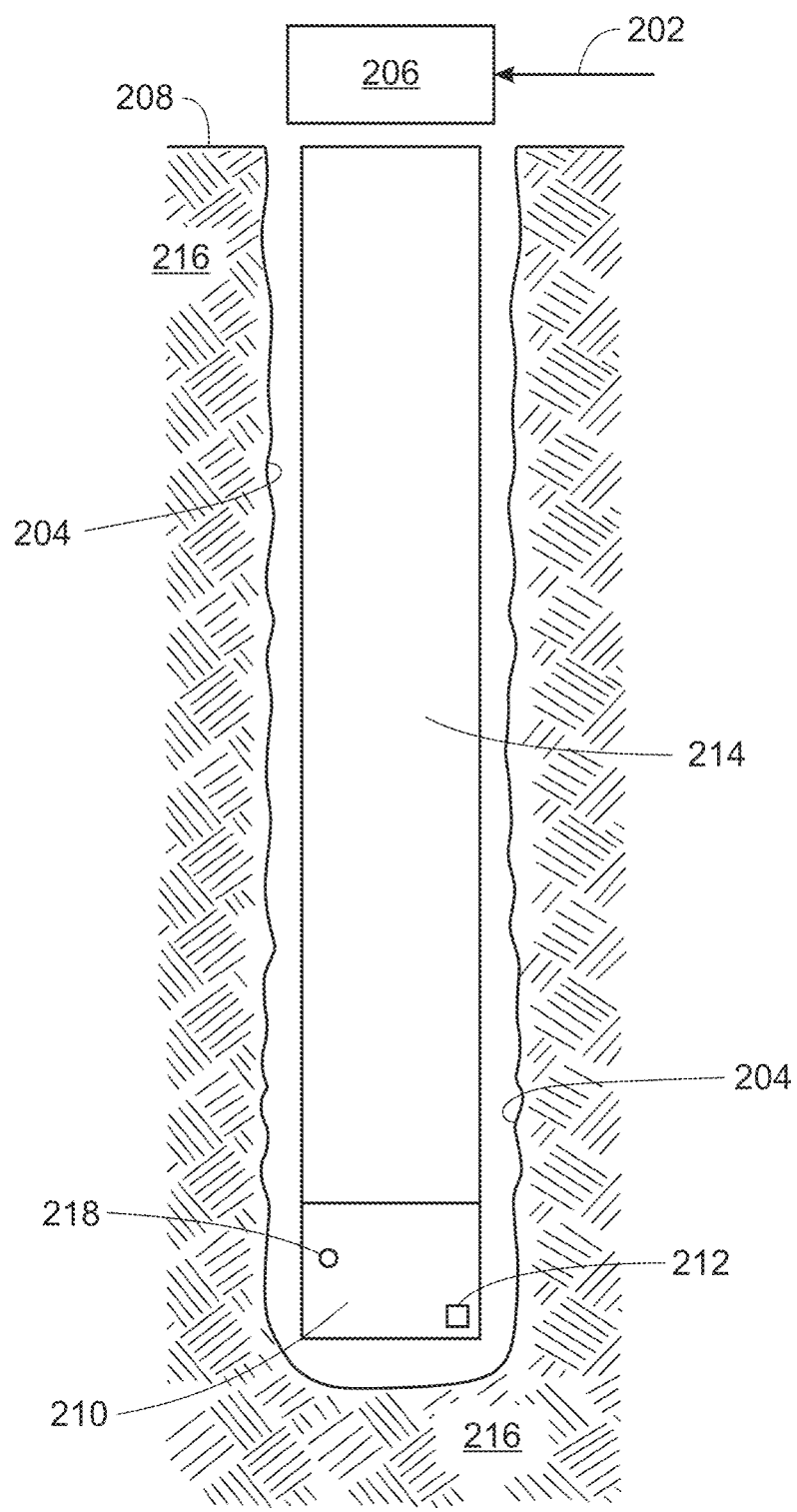
FIG. 2 is a diagram of a well site that is a drill site.

FIG. 2 is a well site 200 that is a drill site. In operation, the well site 200 may prepare or receive drilling fluid 202 incorporating nitrogen-generating compounds (thermochemical reagents), polymer (e.g., PAM or PAM copolymer), crosslinker, foaming compound, optionally an adsorption system (e.g., an amino-silane system), and so forth. The drilling fluid 202 may be the treatment fluid as discussed above.

Well drilling or borehole drilling may form a hole in the ground for the extraction or exploration of a natural resource, such as ground water, brine, natural gas, petroleum, metallic ore, and so on. The hole may be wellbore 204 (borehole) formed through the Earth surface 208 in a subterranean formation 216.

The well site 200 includes surface equipment 206, such as a mounted drilling rig, piping, storage tanks, and so on, at the Earth surface 208. To form a hole in the ground, a drill bit 210 having multiple cutters 212 may be lowered into the hole and rotated to break the rock formations. In the rotation, the cutters 212 may interface with the ground or formation to grind, cut, scrape, shear, crush, or fracture rock to drill the hole. The drill bit 210 may be a component of a drill string 214 or coupled to the drill string 214. The drill bit 210 may be lowered via the drill string 214 into the wellbore 204 (borehole) to drill the wellbore 204 into the subterranean formation 216 in the Earth crust.

In operation, the drilling fluid 202 (also known as drilling mud) as the aforementioned present treatment fluid is circulated down the drill string 214 and through multiple nozzles 218 in the drill bit 210 to the bottom of the wellbore 204. The drilling fluid 202 may then flow upward towards the surface 208 through an annulus between the drill string 214 and the wall 220 of the wellbore 204. In general with the circulation of the drilling fluid 202, the drilling fluid 202 may cool the drill bit 210, apply hydrostatic pressure upon the formation 216 penetrated by the wellbore 204 to prevent or reduce fluids from flowing into the wellbore 204 from the subterranean formation 216, reduce the torque and the drag force induced by the friction between the drill string 214 and the wellbore 204, carry the formation cuttings up to the surface 208, and so forth. The wellbore 204 diameter may be, for example, in a range from about 3.5 inches (8.9 centimeters) to 30 inches (76 centimeters), or outside of this range. The depth of the wellbore 204 can range from 300 feet (100 meters) to more than 30,000 feet (9,100 meters).

Again, the drilling fluid 202 may be the present treatment fluid. The drilling fluid 202 may include a nitrogen-generating compound(s), polymer (e.g., PAM or PAM copolymer), crosslinker, surfactant, foaming compound (including foamer and/or a foam stabilizer), silicate (e.g., sodium silicate), silane (e.g., 3-aminopropyltriethoxysilane), and so forth. In the illustrated embodiment, the drilling fluid 202 includes at least one nitrogen-generating compound, such as a nitrite-containing compound and/or an ammonium-containing compound.

In flowing upward through the annulus between the drill string 214 and the wellbore wall 220, the drilling fluid 202 may be lost into the subterranean formation 216 at a lost circulation zone (thief zone) in the formation 216. In other words, the drilling fluid 202 may flow into the formation 216 from the annulus at the lost circulation zone. As the drilling fluid 202 enters the lost circulation zone in the formation 216, the heat (increased temperature) provided by the formation 216 (and/or a chemical activator) may activate the reaction of a nitrogen-generating compound(s) in the drilling fluid 202 to generate nitrogen gas that foams polymer in the treatment fluid. The foamed polymer may be crosslinked via a crosslinker in the treatment fluid and plug the lost circulation zone to cure the lost circulation. In some implementations, an adsorption system in the treatment fluid may further promote bonding of the foamed polymer to formation rock in the lost circulation zone.

In the lost circulation zone, the foam can be formed from via the thermochemical reaction generating gas (e.g., nitrogen) and with additional cause for the foam formation via surfactant and/or foaming compound (foaming agent and/or foam stabilizer) in the drilling fluid 202, and/or via bicarbonate (optionally included in the drilling fluid 202) generating carbon dioxide gas, and so forth. Again, the drilling fluid 202 as the present treatment fluid may include contains thermochemical reagents (and optionally an associated chemical activator included in the drilling fluid 202 or provided after pumping the drilling fluid 202) and can include surfactants, foaming compond, nanoparticles, a compound (e.g., bicarbonate, such as calcium bicarbonate or sodium bicarbonate) for generating carbon dioxide ($CO_2$), and the like.

The thermochemical reagents may start to react and generate nitrogen ($N_2$) gas due to subterranean formation heat (temperature) in the lost circulation zone and/or due a chemical activator (e.g., acid) included in the drilling fluid 202 (or provided separate from the drilling fluid 202). Such gas generation may form in-situ foam and facilitate coverage of the sealing polymer (polymer gel) across features of the lost circulation zone. As mentioned, bicarbonate (e.g., calcium bicarbonate, sodium bicarbonate, etc.) (and an associated acid) can be included in the drilling fluid 202 to generate in situ $CO_2$ gas, which may also create more stabilized foam.

Once the wellbore 204 is drilled, the wellbore 204 may be completed in implementations. Certain implementations of the drilling fluid 202 as the present treatment fluid may be utilized as a completion fluid or workover fluid.

The technique may include producing hydrocarbon from the subterranean formation through the wellbore 204 and a production valve at the wellhead after wellbore completion. The method may include producing the hydrocarbon from the subterranean formation through production tubing (in the wellbore 204) and the production valve via formation 216 pressure. The completed wellbore 204 may include casing having perforations for introduction of the hydrocarbon into the wellbore 204 from the subterranean formation 216. The producing of the hydrocarbon through the wellbore 204 may involve flowing the hydrocarbon (e.g., natural gas and crude oil) through the production tubing in the wellbore 204. During the desired hydrocarbon production, the wellhead may include a production valve (e.g., sales valve) for the flow (discharge) of produced hydrocarbon, such as natural gas (and crude oil). The hydrocarbon may flow from the production tubing (not shown) in the wellbore 104 through the wellhead (flow through the production valve into a discharge conduit, e.g., sales line). In embodiments, the production valve may be a motor operated valve (MOV).

Figure 3:
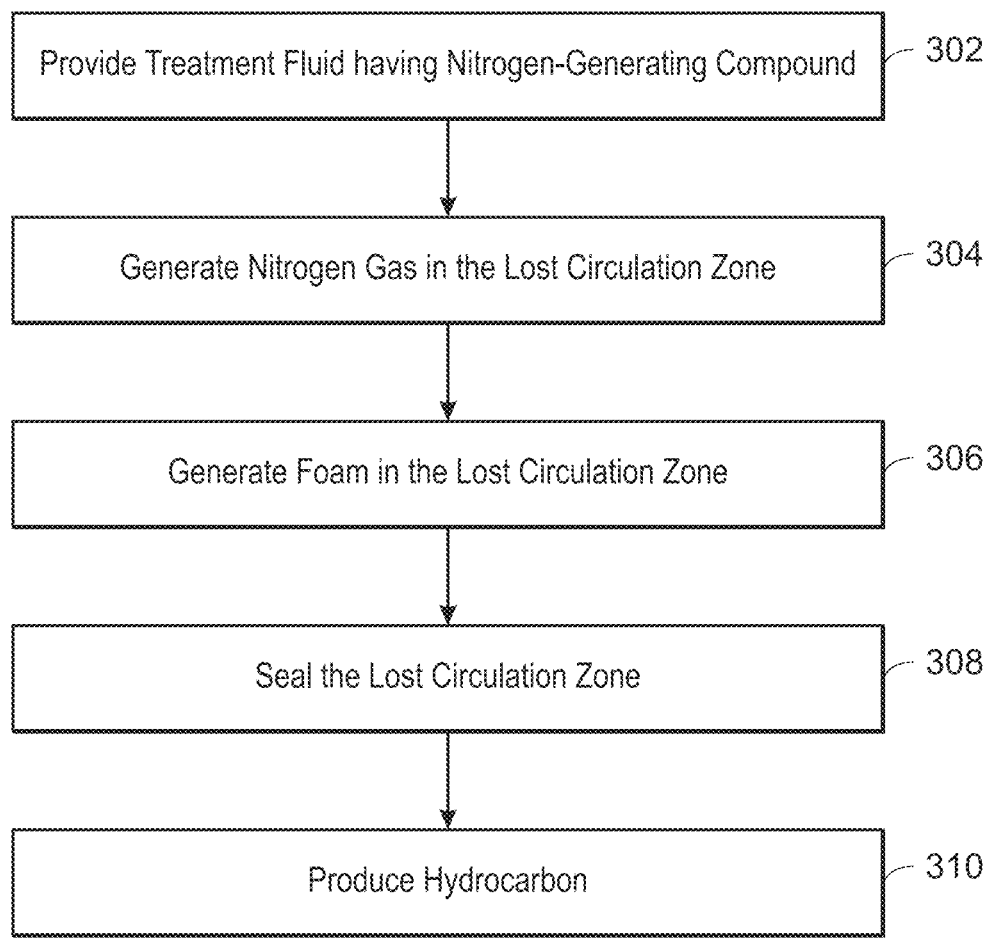
FIG. 3 is a block flow diagram of a method of treating lost circulation.

FIG. 3 is a method 300 of treating lost circulation. The treatment of lost circulation may restrict or stop loss of fluid from a wellbore into a lost circulation zone in a subterranean formation. The treatment fluid is generally as discussed above. The treatment fluid may be a water-based (aqueous) treatment fluid. The treatment fluid may be a drilling fluid (mud) or a lost circulation fluid for treating lost circulation.

At block 302, the method includes providing (e.g., introducing, injecting, pumping, etc.) the treatment fluid having a polymer and at least one nitrogen-generating compound through a wellbore into the lost circulation zone in the subterranean formation. The nitrogen-generating compound may be, for example, at least one of [1] a nitrite-containing compound (e.g., sodium nitrite or potassium nitrite, or both) or [2] an ammonium-containing compound. In implementations, the nitrogen-generating compound includes the nitrite-containing compound. In implementations, the nitrogen-generating compound(s) is (are) not encapsulated.

The polymer may be polyacrylamide homopolymer or a polyacrylamide copolymer, or both. The polyacrylamide copolymer may be a copolymer of acrylamide monomer units and acrylic acid monomer units or a copolymer of acrylamide monomer units and acrylate monomer units, or both. The polymer may include polyacrylamide including at least one of polyacrylamide homopolymer (PAM), PAM-co-AA that is a copolymer of acrylamide (monomer units) and acrylic acid (monomer units), or a copolymer of acrylamide (acrylamide monomer units) and an acrylate (acrylate monomer units), and so forth. The treatment fluid may include a crosslinker, such as polyethyleneimine or other crosslinker, for crosslinking the polymer. The well site may have a delivery system (e.g., including a vessel, pump, etc.) at the Earth surface near or adjacent the wellbore for providing the treatment fluid through the wellbore into the lost circulation zone. In implementations, the delivery system may be (or part of) a drilling fluid recirculation system.

In implementations, foam is not added to, nor generated in, the treatment fluid at Earth surface. In implementations, nitrogen gas is not added to the treatment fluid (e.g., at Earth surface) prior to introduction of the treatment fluid into the wellbore, foam is not added to the treatment fluid (e.g., at Earth surface) prior to the introduction of the treatment fluid into the wellbore, and foam is not generated in the treatment fluid (e.g., at Earth surface) prior to the introduction of the treatment fluid into the wellbore.

At block 304, the method includes generating (forming) nitrogen gas (in-situ) in the lost circulation zone by a reaction (e.g., thermochemical reaction) of the nitrogen-generating compound(s), wherein the reaction is activated (triggered) by a temperature (heat) of the subterranean formation or by an acid, or both. The acid may include weak acids (e.g., acetic acid, citric acid, etc.) and/or strong acids (hydrochloric acid, etc.). In general, a compound capable of releasing an acidic hydrogen can be utilized as the chemical activator (acid activator) in implementations. As indicated, however, reservoir temperature (temperature of the subterranean formation) may be adequate to activate the thermochemical reaction without a chemical activator (e.g., the acid).

In implementations, the reaction is activated by the temperature of the subterranean formation (at the lost circulation zone) and not by an acid. In some of those implementations, the treatment fluid generally does not include activator acid, nor is such activator acid typically otherwise provided to the lost circulation zone during the treatment.

In implementations, acid (activator acid) is provided to the lost circulation zone, wherein the reaction is activated by the acid and not by the temperature of the subterranean formation, and wherein the treatment fluid as provided through the wellbore does not include the acid. Instead, the acid may be provided through the wellbore to the lost circulation zone after providing the treatment to the lost circulation zone.

In implementations, the reaction may be activated by both subterranean formation temperature and the acid. For instance, the temperature of the formation (in the lost circulation zone) may trigger and promote the reaction, and the acid may further activate (promote) the thermochemical reaction.

In implementations, the nitrogen-generating compound is the nitrite-containing compound and the reaction involves dissociation of the nitrite-containing compound into the nitrogen gas. In some of these implementations, the generating (forming) of the nitrogen gas does not involve an ammonium-containing compound. In other words, the nitrogen-generating compound does not additionally include the ammonium-containing compound.

In implementations, the nitrogen-generating compound includes the nitrite-containing compound and additionally includes as a second nitrogen-generating compound the ammonium-containing compound. In these implementations, the reaction includes a reaction (e.g., thermochemical reaction) of the nitrite-containing compound with the ammonium-containing compound to generate the nitrogen gas. In a specific implementation, the ammonium-containing compound includes ammonium chloride, and the nitrite-containing compound includes sodium nitrite or potassium nitrite, or both. In some of these implementations, the method may include injecting the acid through the wellbore into the lost circulation zone after injecting the treatment fluid through the wellbore into the lost circulation zone, wherein the reacting of the nitrite-compound with the ammonium-containing compound is activated by at least the acid.

The method may include forming nitrogen gas via activation of the reaction of the at least one nitrogen-generating compound in the lost circulation zone, thereby foaming (see block 306) the treatment fluid in the lost circulation zone to give foamed treatment fluid having the polymer, wherein the activation is by heat (from the subterranean formation) or by acid, or both.

At block 306, the method includes generating foam (in-situ) from the nitrogen gas and the treatment fluid in the lost circulation zone to give foamed polymer in the lost circulation zone. The generating of the foam in the lost circulation zone may be via the nitrogen gas giving the polymer as foamed polymer in the lost circulation zone. The treatment fluid as foamed includes the foamed polymer. The method can include generating foam in-situ from the nitrogen gas and the treatment fluid in the lost circulation zone to give foamed treatment fluid in the lost circulation zone, wherein the foamed treatment fluid includes foamed polymer.

At block 308, the method includes sealing (plugging, damaging, curing, etc.) the lost circulation zone with the foamed polymer (sealing the lost circulation zone with the treatment fluid as foamed), resulting in the foamed polymer restricting fluid flow from the wellbore into the formation at the lost circulation zone. The sealing of the lost circulation zone may involve allowing the foamed polymer to harden to give solid (e.g., hardened) foam polymer in the lost circulation zone that blocks (restricts or substantially fully blocks) fluid flow from the wellbore into the lost circulation zone, thereby providing for treating (curing) of the lost circulation zone.

In the foamed treatment fluid in the lost circulation zone, the polymer of the foamed polymer may undergo crosslinking via the crosslinker. Thus, the foamed polymer may become a solid foam polymer that restricts fluid flow from the wellbore into the subterranean formation at the lost circulation zone. The method may include crosslinking the polymer with the crosslinker (e.g., into a polymer gel), wherein the foamed polymer solidifies (hardens) into a solid foamed polymer. Thus, the method may include crosslinking the polymer via the crosslinker to give crosslinked polymer, wherein the foamed treatment fluid includes the crosslinked polymer, and wherein the crosslinked polymer as foamed restricts fluid flow (lost circulation) from the wellbore into the lost circulation zone. Further, the method may include bonding the foamed polymer to rock in the lost circulation zone via an adsorption system (e.g., having a silane), wherein the treatment fluid as provided into the wellbore includes the adsorption system. The treating (curing) of the lost circulation may be to solidify (harden) the foamed polymer to give solid foam polymer gel in the lost circulation zone that damages the lost circulation zone, thereby reducing or preventing flow (lost circulation) of fluid from the wellbore into the subterranean formation at the lost circulation zone.

At block 310, the method may include producing hydrocarbon (e.g., natural gas and/or crude oil) from the subterranean formation through the wellbore to the Earth surface. The motive force for flow of the hydrocarbon may be pressure of the subterranean formation. To initiate production, a production valve at the wellhead may be opened. In implementations, the produced hydrocarbon may discharge from the wellbore through the production valve into a sales line (conduit). The produced hydrocarbon may be discharged for distribution or downstream processing. This production may generally occur after completion of blocks 202-208 to seal (shutoff) the lost circulation zone.

An embodiment is a method of treating lost circulation, including providing a treatment fluid having a polymer and at least one nitrogen-generating compound through a wellbore into a lost circulation zone in a subterranean formation. The at least one nitrogen-generating compound may be or include a nitrite-containing compound. The method includes generating nitrogen gas in the lost circulation zone by a reaction of the at least one nitrogen-generating compound, wherein the reaction is activated by a temperature of the subterranean formation or by an acid, or both. In implementations, the reaction is activated by the temperature of the subterranean formation. In implementations, the method includes providing the acid to the lost circulation zone, wherein the reaction is activated by the acid. In implementations with the at least one nitrogen-generating compound as or including a nitrite-containing compound, the reaction of the nitrite-containing compound may involve dissociation of the nitrite-containing compound into the nitrogen gas, wherein the nitrite-containing compound can be sodium nitrite or potassium nitrite, or both, and wherein the at least one nitrogen-generating compound does not include an ammonium-containing compound. In implementations, the at least one nitrogen-generating compound may include a nitrite-generating compound and an ammonium-containing compound, wherein the reaction involves a reaction of the nitrite-containing compound with the ammonium-containing compound to generate the nitrogen gas. The ammonium-containing compound may be, for example, ammonium hydroxide, ammonium chloride, ammonium bromide, ammonium nitrate, ammonium nitrite, ammonium sulfate, ammonium carbonate, or ammonium hydroxide, or any combinations thereof. In certain implementations, the ammonium-containing compound includes ammonium chloride, and the nitrite-containing compound includes sodium nitrite or potassium nitrite, or both.

The method includes generating foam from the nitrogen gas and the treatment fluid in the lost circulation zone to give foamed polymer in the lost circulation zone. The foamed polymer may be or become a foamed gel. The method includes plugging the lost circulation zone with the foamed polymer. The plugging of the lost circulation zone with the foamed polymer may involve allowing the foamed polymer to solidify to give solid foam polymer in the lost circulation zone that damages the lost circulation zone, thereby reducing or preventing flow of fluid from the wellbore into the subterranean formation at the lost circulation zone. Lastly, in implementations, nitrogen gas is not added to the treatment fluid prior to introduction of the treatment fluid into the wellbore, foam is not added to the treatment fluid prior to the introduction of the treatment fluid into the wellbore, and foam is not generated in the treatment fluid prior to the introduction of the treatment fluid into the wellbore.

Another embodiment is a method of treating lost circulation, including providing a treatment fluid having a polymer, a crosslinker, and a nitrogen-generating compound through a wellbore into a lost circulation zone in a subterranean formation. The polymer may include polyacrylamide homopolymer or a polyacrylamide copolymer, or both. The polyacrylamide copolymer may include, for example, a copolymer of acrylamide monomer units and acrylic acid monomer units or a copolymer of acrylamide monomer units and acrylate monomer units, or both. The nitrogen-generating compound (which may or may not be encapsulated) may include a nitrite-containing compound, such as sodium nitrite or potassium nitrite, or both. The method includes generating nitrogen gas in-situ in the lost circulation zone by a reaction of the nitrogen-generating compound, wherein the reaction is activated by a temperature of the subterranean formation or by an acid, or both. In implementations, the nitrogen-generating compound includes the nitrite-containing compound and an ammonium-containing compound, wherein the reaction to generate nitrogen gas involves a thermochemical reaction of the nitrite-containing compound with the ammonium-containing compound. The method includes generating foam in-situ from the nitrogen gas and the treatment fluid in the lost circulation zone to give foamed treatment fluid in the lost circulation zone, wherein the foamed treatment fluid includes foamed polymer. In implementations, foam is not added to, nor generated in, the treatment fluid at Earth surface. Lastly, the method includes sealing the lost circulation zone with the foamed treatment fluid, wherein the polymer of the foamed polymer undergoes crosslinking via the crosslinker to give a foamed polymer gel. The sealing of the lost circulation zone may involve the foamed polymer gel as a solid restricting flow of wellbore fluid into the subterranean formation at the lost circulation zone.

Yet another embodiment is a method of treating lost circulation, including injecting a treatment fluid having a polymer, a crosslinker, and a nitrite-containing compound (e.g., sodium nitrite or potassium nitrite, or both) through a wellbore into a lost circulation zone in a subterranean formation. The polymer may include polyacrylamide. The nitrite-containing compound may or may not be encapsulated. The polyacrylamide may include at least one of polyacrylamide (PAM) homopolymer, a copolymer of acrylamide and an acrylate, or PAM-co-AA that is a copolymer of acrylamide and acrylic acid. The method includes reacting the nitrite-containing compound in the lost circulation zone to give nitrogen gas in the lost circulation zone. The treatment fluid may include an ammonium-containing compound. The reacting of the nitrite-containing compound in the lost circulation zone to give nitrogen gas may include reacting the nitrite-containing compound with the ammonium-containing compound (if included in the treatment fluid) in the lost circulation zone to give the nitrogen gas in the lost circulation zone. The reacting of the nitrite-containing compound with the ammonium-containing compound may be activated by heat from the subterranean formation or by an acid, or a combination thereof. The method may include injecting the acid through the wellbore into the lost circulation zone after injecting the treatment fluid through the wellbore into the lost circulation zone, wherein the reacting of the nitrite-compound with the ammonium-containing compound is activated by at least the acid. The method includes generating foam in the lost circulation zone via the nitrogen gas giving the polymer as foamed polymer in the lost circulation zone. The method includes sealing the lost circulation zone with the foamed polymer. This sealing of the lost circulation zone may involve the foamed polymer as a foamed polymer gel restricting fluid flow from the wellbore into the subterranean formation at the lost circulation zone. The method may include crosslinking the polymer in the foamed polymer with the crosslinker to give the foamed polymer gel, wherein the foamed polymer hardens into the foamed polymer gel as a solid foamed polymer gel. The method may include bonding the foamed polymer to rock in the lost circulation zone via an adsorption system having a silane, wherein the treatment fluid includes the adsorption system, and wherein the polymer includes polyacrylamide homopolymer or polyacrylamide copolymer. Lastly, in implementations, nitrogen gas is not added to the treatment fluid prior to introduction of the treatment fluid into the wellbore, foam is not added to the treatment fluid prior to introduction of the treatment fluid into the wellbore, and foam is not generated in the treatment fluid prior to introduction of the treatment fluid into the wellbore.

Yet another embodiment is a method of treating lost circulation, including pumping a treatment fluid comprising a polymer, a crosslinker, and a nitrogen-generating compound through a wellbore into a lost circulation zone in a subterranean formation. In implementations, the nitrogen-generating compound includes sodium nitrite or potassium nitrite, or both, and wherein forming the nitrogen gas does not involve an ammonium-containing compound. The method includes forming nitrogen gas via activation of a reaction of the nitrogen-generating compound in the lost circulation zone, thereby foaming the treatment fluid in the lost circulation zone to give foamed treatment fluid including the polymer as foamed polymer, wherein the activation is by heat or by acid, or both, wherein the heat is from the subterranean formation, and wherein nitrogen gas is not added to the treatment fluid at Earth surface. In implementations, the nitrogen-generating compound includes an ammonium-containing compound and a nitrite-containing compound, wherein the reaction includes a thermochemical reaction of the ammonium-containing compound with the nitrite-containing compound. The method includes crosslinking the foamed polymer via the crosslinker to give foamed crosslinked polymer including a foamed polymer gel, wherein the foamed polymer gel restricts fluid flow from the lost circulation zone into the wellbore.

Example

A treatment fluid as a lost circulation fluid (for treating lost circulation) having sodium nitrite as a nitrogen-generating compound was prepared in the laboratory. The polymer in the treatment fluid was PAM-co-AA.

The treatment fluid (for treating lost circulation) having sodium nitrite as a nitrogen-generating compound was prepared in the laboratory. The activating or triggering of the sodium nitrite (or triggering/activation of the reaction of the sodium nitrite) to generate nitrogen gas may be by temperature (heat) and/or acid (e.g., acetic acid, citric acid, or hydrochloric acid). The treatment fluid as prepared in the laboratory in this Example included water, the polymer PAM-co-AA, crosslinker, formaldehyde, sodium silicate, foaming agent, foam stabilizer, surfactant, 3-aminopropyltriethoxysilane, and the nitrogen-generating compound (sodium nitrite).

Two solutions were initially prepared: (1) polymer solution and (2) adsorption system. To give the treatment fluid, solution (1) was slowly added to solution (2).

The (1) polymer solution was prepared by starting with 82 grams (g) of a solution of 4 w/v % of PAM-co-AA in water. Then, 1.1 g of a 37 wt % formaldehyde solution in water was added to and mixed thoroughly with the 82 g of the PAM-co-AA solution. This mixture was left untouched for 30 minutes to reactor (this time can be longer if beneficial). Subsequently, sodium nitrite was added, and then a foaming agent, crosslinker, surfactant, and foam stabilizer were added to give the polymer solution.

The (2) adsorption system solution was prepared by starting with 28.6 g of liquid sodium silicate. Then, 368 milliliters (mL) (386 g) of distilled water was added to and mixed with the sodium silicate giving an initial mixture at 396.6 g. Then, 20.5 mL of 3-aminopropyltriethoxysilane was added to and mixed thoroughly with the mixture to give the adsorption system solution.

The (1) polymer solution was slowly added to and mixed with the (2) adsorption system solution to give the treatment fluid. In practice in the field, the combining of the polymer solution and the adsorption system can occur when ready to pump the treatment fluid into the wellbore. In implementations, the polymer solution and the adsorption system are not combined before one hour of pumping the treatment fluid into the wellbore. After pumping the treatment fluid, the nitrogen generating reaction may be activated by downhole temperature, or by an acid (e.g., acetic acid). The acid can be (a) injected into the wellbore or (b) encapsulated within the treatment fluid.

Figure 4:
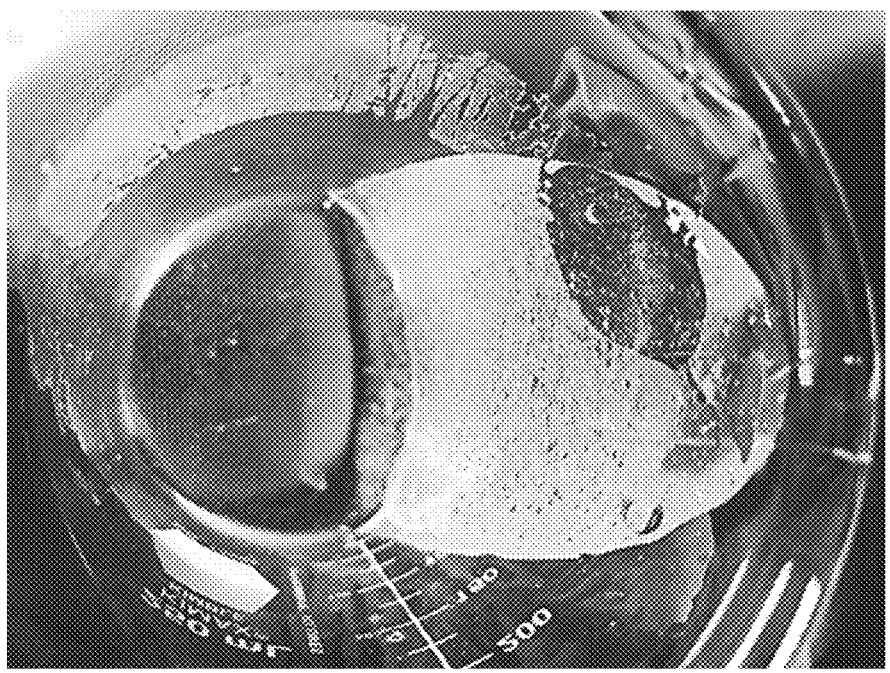
FIG. 4 is an image of the treatment fluid prepared in the Example prior to activation of the reaction of the sodium nitrite in the treatment fluid to generate nitrogen gas.

FIG. 4 depicts the treatment fluid prior to activation of the reaction of the sodium nitrite to generate nitrogen gas. The treatment fluid can be labeled as an in-situ foam generating polymer system or an in-situ foaming lost-circulation fluid. The depicted sample is a pre-activated sample (the sodium nitrite not yet activated to generate nitrogen gas) and may be as prepared and mixed at surface in the field. This sample may be analogous to the treatment fluid in the field as prepared at surface prior to introduction into the wellbore. As indicated by the depicted image of the sample, foam is not yet created. As can be seen from the image (photo), foam is not yet generated. Thus, it may generally be practical to pump the fluid from surface and squeeze into the lost circulation zone, and in which hydrostatic pressure may be relatively high. Thus, commercial implementations may pump the treatment fluid from surface for squeeze into the formation, and in which the hydrostatic pressure of the treatment fluid in the wellbore may be greater than the hydrostatic pressure of the treatment fluid if foamed at the surface (such as with the addition of nitrogen gas at surface). The sample in FIG. 4 looks similar to conventional polymer fluid. This depicted example of the present treatment fluid is visually similar in appearance to conventional polymer fluid (without a nitrogen-generating component).

Figure 5:
FIG. 5 is an image of an activated sample of the treatment fluid in the Example giving foamed polymer.

FIG. 5 depicts an activated sample of the treatment fluid giving foamed polymer as the sample (as shown). In particular, depicted is a sample of the treatment fluid prepared in the Example and in which the reaction of the sodium nitrite in the sample has been activated, thereby generating nitrogen gas within the sample. The activation of the treatment fluid (or activation of the reaction of the sodium nitrite in the treatment fluid) was by increasing the temperature of the treatment fluid to 200° F.

Therefore, commercially, as the treatment fluid (e.g., drilling fluid) is leaked into the thief zone, reaction may be activated by formation temperature, which is generally higher than treatment fluid (e.g., drilling fluid) temperature. Accordingly, foamed gel may be generated in-situ to seal thief zone.

In this Example, the generated nitrogen gas foamed the sample of the treatment fluid giving the sample as foamed polymer or foamed gel. The depicted sample may be characterized as in-situ foamed lost-circulation fluid analogous to when the treatment fluid is implemented in a lost circulation zone in a subterranean formation.

In the field, as the treatment fluid reaches the lost circulation zone, the reaction of the nitrogen-generating compound (e.g., sodium nitrite, etc.) may be activated by downhole temperature and thus foamed fluid generated in-situ to seal (plug) the lost circulation zone. This may (a) eliminate the need for a gas source on the surface and (b) avoid mixing challenges to prepare foam at the surface.

Figure 7:
FIGS. 6-7 are images of samples of the treatment fluid prepared in the Example after activation and drying to give the sample as dried foamed treatment fluid (dried foamed polymer or polymer gel) after several days.
Figure 6:
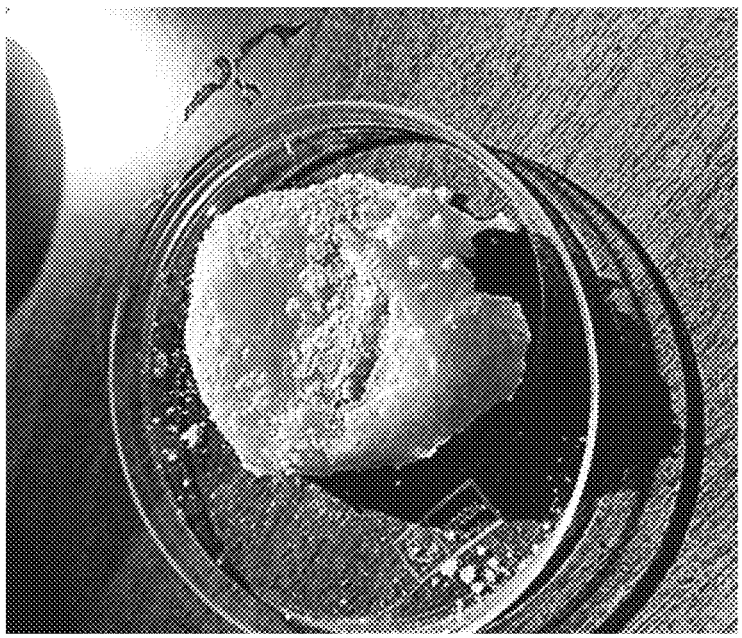

FIGS. 6-7 show a sample of the treatment fluid prepared in the Example after activation and drying to give the sample as dried foamed treatment fluid (dried foamed polymer) after several days that is a solid and stable. For analogy in the field, the sample may be labeled as dried in-situ foamed polymer having stability.

The employment of a single (only one) nitrogen-generating compound (a single type) in the treatment fluid may be sufficient to generate an adequate amount of nitrogen gas to give the foamed polymer for curing lost circulation. In this Example, only sodium nitrite was utilized (as the nitrogen-generating compound) to generate nitrogen gas. This Example did not include an ammonium-containing compound (e.g., ammonium chloride, etc.) as a nitrogen-generating compound in the treatment fluid to give the foamed polymer (for treating lost circulation). However, the thermochemical reaction of sodium nitrite with ammonium chloride in a fluid has been confirmed to generate nitrogen gas. These nitrogen-generating compounds generate nitrogen gas when activated, such as by heat or acids. See the above depicted thermochemical reaction equation of ammonium chloride and sodium nitrite.

A number of implementations have been described. Nevertheless, it will be understood that various modifications may be made without departing from the spirit and scope of the disclosure.

What is claimed is:

1. A method of treating lost circulation, comprising:
providing a treatment fluid comprising a polymer and at least one nitrogen-generating compound comprising a nitrite-containing compound through a wellbore into a lost circulation zone in a subterranean formation, wherein the polymer comprises polyacrylamide homopolymer or polyacrylamide copolymer, or both;
generating nitrogen gas in the lost circulation zone by a reaction of the at least one nitrogen-generating compound, wherein the reaction is activated by a temperature of the subterranean formation or by an acid, or both;
generating foam from the nitrogen gas and the treatment fluid in the lost circulation zone to give foamed polymer in the lost circulation zone;
plugging the lost circulation zone with the foamed polymer; and
bonding the foamed polymer to rock in the lost circulation zone via an adsorption system comprising a silane, wherein the treatment fluid comprises the adsorption system.

2. The method of claim 1, wherein the reaction is activated by the temperature of the subterranean formation, and wherein the foamed polymer comprises foamed gel.

3. The method of claim 1, comprising providing the acid to the lost circulation zone, wherein the reaction is activated by the acid.

4. The method of claim 1, wherein plugging the lost circulation zone comprises allowing the foamed polymer to solidify to give solid foam polymer in the lost circulation zone that damages the lost circulation zone, thereby reducing or preventing flow of fluid from the wellbore into the subterranean formation at the lost circulation zone.

5. The method of claim 1, wherein the reaction comprises dissociation of the nitrite-containing compound into the nitrogen gas, wherein the nitrite-containing compound comprises sodium nitrite or potassium nitrite, or both, and wherein the at least one nitrogen-generating compound does not comprise an ammonium-containing compound.

6. The method of claim 1, wherein the at least one nitrogen-generating compound comprises an ammonium-containing compound, and wherein the reaction comprises a reaction of the nitrite-containing compound with the ammonium-containing compound to generate the nitrogen gas.

7. The method of claim 6, wherein the ammonium-containing compound comprises ammonium chloride, and wherein the nitrite-containing compound comprises sodium nitrite or potassium nitrite, or both.

8. The method of claim 6, wherein the ammonium-containing compound comprises, ammonium chloride, ammonium bromide, ammonium nitrate, ammonium nitrite, ammonium sulfate, ammonium carbonate, or ammonium hydroxide, or any combinations thereof.

9. The method of claim 1, wherein nitrogen gas is not added to the treatment fluid prior to introduction of the treatment fluid into the wellbore, wherein foam is not added to the treatment fluid prior to the introduction of the treatment fluid into the wellbore, and wherein foam is not generated in the treatment fluid prior to the introduction of the treatment fluid into the wellbore.

10. A method of treating lost circulation, comprising:
providing a treatment fluid comprising a polymer, a crosslinker, and at least one nitrogen-generating compound comprising a nitrite-containing compound through a wellbore into a lost circulation zone in a subterranean formation, wherein the polymer comprises polyacrylamide homopolymer or polyacrylamide copolymer, or both;
generating nitrogen gas in-situ in the lost circulation zone by a reaction of the at least one nitrogen-generating compound, wherein the reaction is activated by a temperature of the subterranean formation or by an acid, or both;
generating foam in-situ from the nitrogen gas and the treatment fluid in the lost circulation zone to give foamed treatment fluid in the lost circulation zone, wherein the foamed treatment fluid comprises foamed polymer;
sealing the lost circulation zone with the foamed treatment fluid, wherein the polymer of the foamed polymer undergoes crosslinking via the crosslinker to give a foamed polymer gel; and
bonding the foamed polymer gel to rock in the lost circulation zone via an adsorption system comprising a silane, wherein the treatment fluid comprises the adsorption system.

11. The method of claim 10, wherein the nitrogen-generating compound comprises a nitrite-containing compound, and wherein sealing the lost circulation zone comprises the foamed polymer gel as a solid restricting flow of wellbore fluid into the subterranean formation at the lost circulation zone.

12. The method of claim 11, wherein the at least one nitrogen-generating compound comprises an ammonium-containing compound, wherein the reaction comprises a thermochemical reaction of the nitrite-containing compound with the ammonium-containing compound, wherein foam is not added to, nor generated in, the treatment fluid at Earth surface, and wherein the polyacrylamide copolymer comprises a copolymer of acrylamide monomer units and acrylic acid monomer units or a copolymer of acrylamide monomer units and acrylate monomer units, or both.

13. A method of treating lost circulation, comprising:
injecting a treatment fluid comprising a polymer, a crosslinker, and a nitrite-containing compound through a wellbore into a lost circulation zone in a subterranean formation, wherein the polymer comprises polyacrylamide (PAM) homopolymer or PAM copolymer, or both;
reacting the nitrite-containing compound in the lost circulation zone to give nitrogen gas in the lost circulation zone;
generating foam in the lost circulation zone via the nitrogen gas giving the polymer as foamed polymer in the lost circulation zone;
sealing the lost circulation zone with the foamed polymer, wherein sealing the lost circulation zone comprises the foamed polymer as a foamed polymer gel restricting fluid flow from the wellbore into the subterranean formation at the lost circulation zone; and
bonding the foamed polymer to rock in the lost circulation zone via an adsorption system comprising a silane, wherein the treatment fluid comprises the adsorption system.

14. The method of claim 13, comprising crosslinking the polymer in the foamed polymer with the crosslinker to give the foamed polymer gel, wherein the foamed polymer hardens into the foamed polymer gel as a solid foamed polymer gel.

15. The method of claim 14, wherein the PAM copolymer comprises at least one of a copolymer of acrylamide and an acrylate, or PAM-co-AA that is a copolymer of acrylamide and acrylic acid.

16. The method of claim 13, wherein the nitrite-containing compound comprises sodium nitrite or potassium nitrite, or both, and wherein the nitrite-containing compound is not encapsulated.

17. The method of claim 13, wherein the treatment fluid comprises an ammonium-containing compound, and wherein reacting the nitrite-containing compound in the lost circulation zone to give nitrogen gas comprises reacting the nitrite-containing compound with the ammonium-containing compound in the lost circulation zone to give the nitrogen gas in the lost circulation zone.

18. The method of claim 17, wherein the reacting of the nitrite-containing compound with the ammonium-containing compound is activated by heat from the subterranean formation or by an acid, or a combination thereof, wherein nitrogen gas is not added to the treatment fluid prior to introduction of the treatment fluid into the wellbore, wherein foam is not added to the treatment fluid prior to introduction of the treatment fluid into the wellbore, and wherein foam is not generated in the treatment fluid prior to introduction of the treatment fluid into the wellbore.

19. The method of claim 18, comprising injecting the acid through the wellbore into the lost circulation zone after injecting the treatment fluid through the wellbore into the lost circulation zone, wherein the reacting of the nitrite-compound with the ammonium-containing compound is activated by at least the acid.

20. A method of treating lost circulation, comprising:
pumping a treatment fluid comprising a polymer, a crosslinker, and a nitrogen-generating compound through a wellbore into a lost circulation zone in a subterranean formation, wherein the polymer comprises polyacrylamide homopolymer or polyacrylamide copolymer, or both;
forming nitrogen gas via activation of a reaction of the nitrogen-generating compound in the lost circulation zone, thereby foaming the treatment fluid in the lost circulation zone to give foamed treatment fluid comprising the polymer as foamed polymer, wherein the activation is by heat or by acid, or both, wherein the heat is from the subterranean formation, and wherein nitrogen gas is not added to the treatment fluid at Earth surface;
crosslinking the foamed polymer via the crosslinker to give foamed crosslinked polymer comprising a foamed polymer gel, wherein the foamed polymer gel restricts fluid flow from the lost circulation zone into the wellbore; and bonding the foamed polymer gel to rock in the lost circulation zone via an adsorption system comprising a silane, wherein the treatment fluid comprises the adsorption system.

21. The method of claim 20, wherein the nitrogen-generating compound comprises sodium nitrite or potassium nitrite, or both, and wherein forming the nitrogen gas does not involve an ammonium-containing compound.

22. The method of claim 20, wherein the nitrogen-generating compound comprises an ammonium-containing compound and a nitrite-containing compound, wherein the reaction comprises a thermochemical reaction of the ammonium-containing compound with the nitrite-containing compound.

\* \* \* \* \*